United States Patent [19]

Hennevin

[11] Patent Number: 4,555,754
[45] Date of Patent: Nov. 26, 1985

[54] EQUALIZER CIRCUIT FOR SWITCHES CONNECTED IN SERIES

[75] Inventor: Bernard Hennevin, Decines, France

[73] Assignee: Compagnie Electro-Mecanique, Paris, France

[21] Appl. No.: 615,450

[22] Filed: May 30, 1984

[30] Foreign Application Priority Data

May 30, 1983 [FR] France ............................ 83 08891

[51] Int. Cl.$^4$ .......................................... H02M 7/537
[52] U.S. Cl. ..................................... 363/132; 363/56; 363/57; 363/124; 363/136; 361/56; 361/91
[58] Field of Search ............................. 363/55–58, 363/68, 124, 132, 136; 361/56, 91

[56] References Cited

U.S. PATENT DOCUMENTS 4,276,588  6/1981  McLymann et al. ................ 363/56

FOREIGN PATENT DOCUMENTS

| 28328 | 9/1970 | Japan | 363/57 |
| 136173 | 10/1981 | Japan | 363/136 |
| 36171 | 3/1983 | Japan | 363/124 |
| 48305 | 5/1983 | Japan | 363/124 |
| 610269 | 5/1978 | U.S.S.R. | 363/132 |
| 881948 | 11/1981 | U.S.S.R. | 363/68 |

OTHER PUBLICATIONS

Patent Abstracts of Japan, vol. 6, No. 16, (Abstract of Japanese Document "AL").

Primary Examiner—William H. Beha, Jr.
Attorney, Agent, or Firm—Sughrue, Mion, Zinn, Macpeak & Seas

[57] ABSTRACT

An equalizer circuit for switches connected in series between a voltage source (21) and a load (16), each switch (4, 11) being connected in parallel with a respective equalizing capacitor (2, 9) via a respective diode (7, 8). The circuit further includes a transformer (20) having a plurality of windings (6, 13) connected in series with respective diodes (5, 12), with each switch having a respective winding-diode series connection connected in parallel therewith. In this manner, electrical energy initially stored in the capacitors is transferred to be stored in magnetic form by the windings when the switches are closed and is re-used when the switches are opened to accelerate charging of the less charged capacitors until all the capacitors reach the voltage of the most charged capacitor. The invention is particularly applicable to semiconductor switches such as transistors or gate turnoff thyristors connected in series and needing protection against exposure to excessive voltages due to differences in switching times between switches.

5 Claims, 7 Drawing Figures

EQUALIZER CIRCUIT FOR SWITCHES CONNECTED IN SERIES

The invention relates to an equalizer circuit for switches connected in series between a voltage source and a load, each switch being connected in parallel with an equalizing capacitor and a diode.

BACKGROUND OF THE INVENTION

Electronic switches used in electrical energy converters such as choppers or inverters are generally semiconductor components such as thyristors, transistors or gate turnoff (GTO) thyristors.

At present the highest voltage which semiconductor devices are capable of withstanding is a few hundreds of volts for transistors and a few thousands of volts for thyristors and GTO thyristors.

When the supply voltage for an electrical energy converter needs to be higher than the voltage which the chosen semiconductor devices can withstand, a plurality of such devices must be connected in series.

The preferred application of the present invention lies in connecting transistors or GTO thyristors in series.

There is a major drawback to connecting transistors or GTO thyristors in series. Manufacturing tolerances are rather wide for such devices, particularly concerning the time lapse between receiving an instruction to open the switch and the switch becming effectively open.

Thus, when two transistors or two turnoff thyristors are connected in series without taking any precautions, the faster acting device at turnoff is temporarily subjected to the full power supply voltage and is destroyed.

Various circuits exist for eliminating this drawback. In particular, the journal "G.E.C. Journal of Science and Technology", volume 47, N° 3, year 1981, pages 121 and 122 describes one such circuit applicable to transistors, and Toschiba's "GTO Application Note," page 17 describes such a circuit applicable to GTO thyristors. In each case a capacitor is connected in parallel with the switching device.

However, these circuits still suffer from two other drawbacks.

Firstly the voltage is not exactly equalized between the two switches since the capacitor associated with the faster acting device at turnoff charges more than the capacitor associated with the slower turnoff device. As a result, both devices in any particular circuit design must have a higher specified maximum permissible voltage than would otherwise be the case.

Secondly, in order to keep this lack of equalization within tolerable limits, capacitors of relatively high capacitance must be used. The energy stored in the capacitors is thus relatively high, and since this energy is dissipated in resistors each time the switches are turned off, efficiency is reduced, and an electrical energy converter using such an arrangement needs extensive cooling.

An improvement may be obtained by using transistors or GTO thyristors which have been selected for matching turnoff characteristics, and only connecting closely matching devices in series. However, this complicates manufacture and thus increases the cost of the devices, and also complicates maintenance of energy converters made using such matched devices.

Preferred embodiments of the present invention improve equalization of voltages across transistors or GTO thyristors connected in series without requiring the devices to have matched characteristics, and with reduced energy losses compared to prior art circuits.

SUMMARY OF THE INVENTION

The present invention provides an equalizer circuit for switches connected in series between a voltage source and a load, each switch being connected in parallel with a respective equalizing capacitor via a respective diode, the improvement wherein the circuit includes a transformer having a plurality of windings each connected in series with a respective diode, with each switch having a respective winding-diode series connection connected in paralle therewith, whereby electrical energy initially stored in the capacitors is transferred to be stored in magnetic form by the windings when the switches are closed and is re-used when the switches are opened to accelerate charging of the less charged capacitors until all the capacitors reached the voltage of the most charged capacitor.

Since the capacitors are connected in parallel with respective ones of the switches, the voltages applied across the switches are thus equalized.

Advantageously, any magnetic energy left over after the equalizing capacitors have been charged is returned to the power supply.

The circuit preferably includes two switches connected in series, but three or more may be connected in series, in which case each switch is connected in parallel with its own winding, and all the windings form part of the same transformer.

In a specific application of the equalization circuit, an inverter has each of its half phases constituted by a series connection of switches equalized by a respective equalizer circuit.

BRIEF DESCRIPTION OF THE DRAWINGS

Embodiments of the invention are described by way of example with reference to the accompanying drawings, in which.

MORE DETAILED DESCRIPTION

Figure 1:
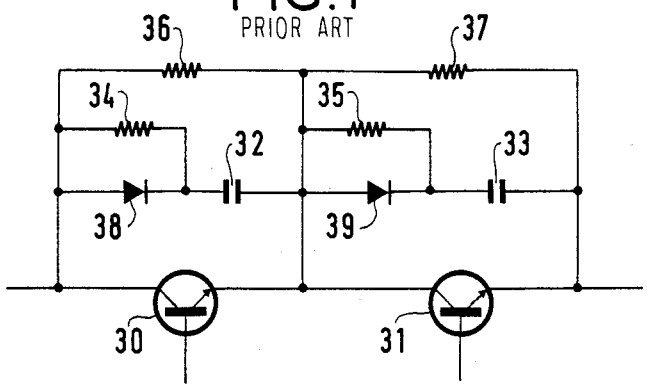
FIG. 1 is a prior art circuit diagram using transistors as switches.

FIG. 1 is a diagram of a prior art circuit using transistors 30, 31 as switches connected in series. Each transistor has a large value capacitor 32, 33 connected in parallel therewith via a respective charging diode 38, 39. Each time the associated switch is closed (turned on) the relatively large amount of energy stored in each capacitor is dissipated in a respective resistor 34, 35 connected in parallel with the associated diode 38, 39.

Figure 2:
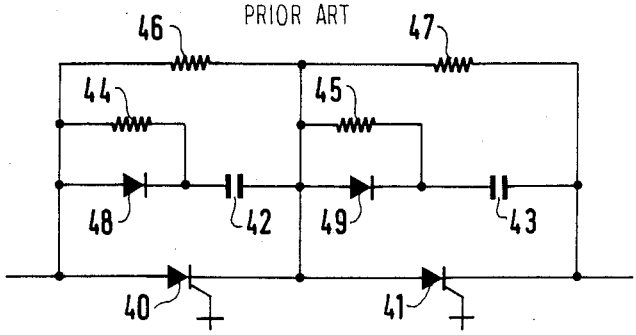
FIG. 2 is a prior art circuit diagram using GTO thyristors as switches.

FIG. 2 is a diagram of a similar prior art circuit using gate turnoff (GTO) thyristors 40, 41 as switches connected in series. Each thyristor has a large value capacitor 42, 43 connected in parallel therewith. As with the transistor circuit of FIG. 1, a relatively large amount of energy is dissipated once each cycle at switch turnon. This energy is dissipated in respective resistors 44 and 45.

Figure 3:
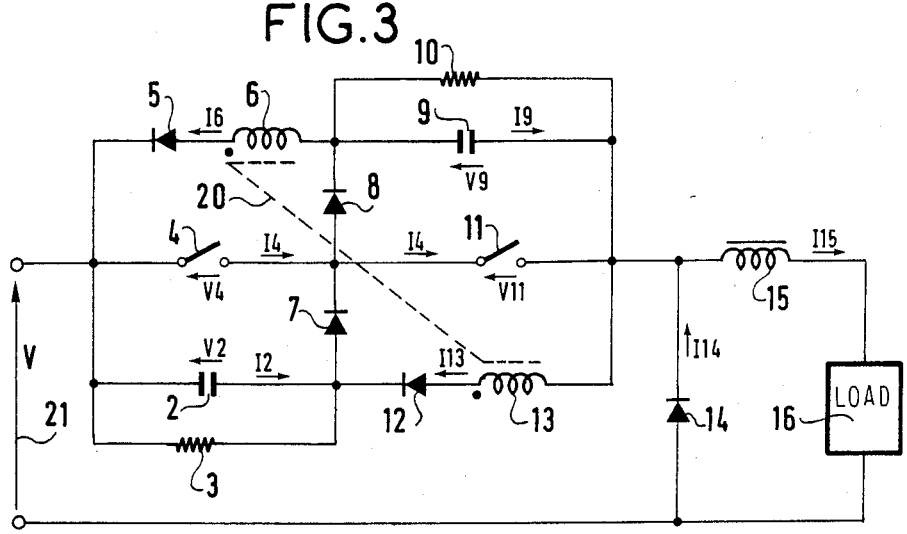
FIG. 3 is a diagram of a circuit in accordance with the invention in which mechanical switches are shown to represent transistors or GTO thyristors.

FIG. 3 is a diagram of a circuit in accordance with the invention. The series connected switches 4 and 11 are drawn as mechanical switches, but represent semiconductor devices which may be transistors or GTO thyristors according to choice. As in the prior art, each switch 4, 11 has a respective capacitor 2, 9 connected in parallel therewith via respective charging diodes 7 and 8. The capacitors are of equal value and the diodes are assumed to be ideal. A first difference from the above-described prior art circuits is that both diodes are connected to the common point where the switches are interconnected. Respective equal value resistances 3 and 10 are connected in parallel with the capacitors 2 and 9, and serve to provide static voltage equalization across the switches 4 and 11. Unlike the prior art circuits described above, each switch 4, 11 also has a respective winding 6, 13 of a transformer 20 connected in parallel therewith. Each winding is itself connected in series with a respective diode to prevent the windings affecting the static equalization provided by the resistances 3 and 10. Each winding and diode series connection is connected in parallel with the corresponding switch via the charging diode 7 or 8 which connects the relevant capacitor in parallel with the other switch, which is why the diodes 7 and 8 are both connected to the common point of the series connection of switches. The windings have the same numbers of turns and are assumed to be ideal, ie. perfectly coupled and of negligible resistance.

The switch circuit shown in FIG. 3 is shown, by way of example, as being part of a voltage chopper, ie. it is connected in series with a load 16, a choke filter 15 and a DC voltage supply 21. The choke 15 and the load 16 are bypassed by a flywheel diode 14.

Figure 4:
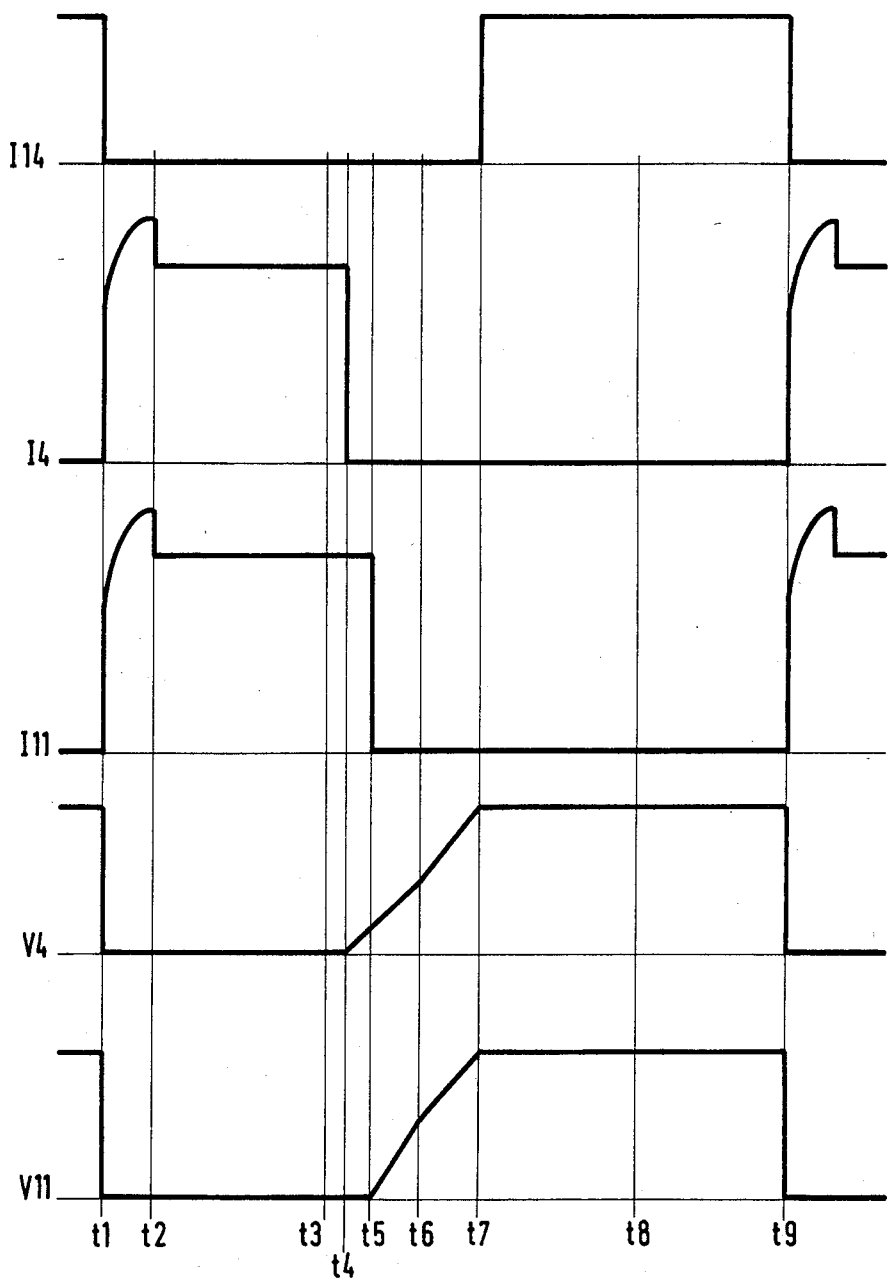
FIGS. 4 and 5 are waveform diagrams showing the voltages and currents to which the main components are subjected during one complete turnoff/turnon cycle.
Figure 5:
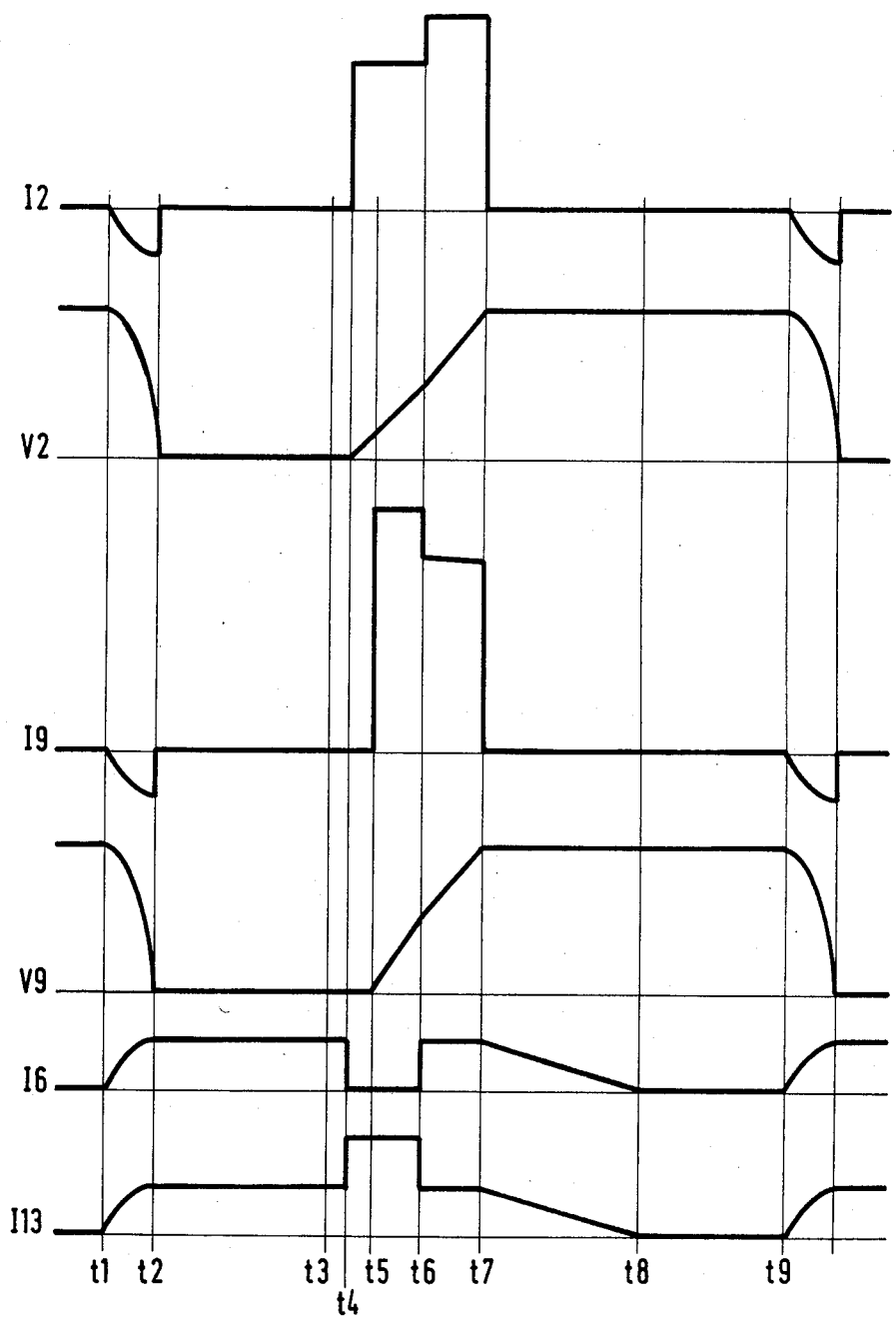

Operation of such a circuit is well known to the person skilled in the art, and reference is made directly to the waveform diagrams of FIGS. 4 and 5.

At a starting instant t1, it is supposed that prior operation of the circuit has caused a current I15 to flow through the flywheel diode 14, the choke 15 and the load 16. It is also supposed that both switches 4 and 11 are off (open) and that the capacitors 2 and 9 are charged to respective voltages V2 and V9 which are both equal to half the supply voltage V, ie. $V2+V9=V$.

At this instant t1, the switches 4 and 11 are closed. The current I15 then passes through the switches 4 and 11 and the diode 14 ceases to conduct.

The capacitors 2 and 9 start to discharge, with the capacitor 2 setting up a current I2 through both switches 4 and 11 and through the winding 13 in series with the diode 12, and with the capacitor 9 setting up a current I9 through both switches 4 and 11 and through the winding 9 and its series connected diode 5.

At instant t2 the capacitors 2 and 9 are fully discharged. They have transmitted their energy to the windings 13 and 6 respectively. This energy is stored in the form of a magnetic field and is manifested by the winding 6 driving a current I6 through the diode 5, the switch 4, and the diode 8, while the winding 13 drives a current I13 through the diode 12, the diode 7, and the switch 11.

Since the windings 6 and 13 have the same number of turns, the currents I6 and I13 are equal.

At instant t3, a signal is sent instructing the switches 4 and 11 to turn off (to open). Due to dispersion of operational characteristics, the switch 4 opens effectively at instant t4 while the switch 11 opens at a different instant t5.

At instant t4 the switch 4 can be considered turned off. The current I4 (equals I15+I6) which was passing through the switch 4 is interrupted. This current is diverted to the capacitor 2 which begins to charge.

The voltage across the terminals of the winding 6 remains equal to zero since the winding 13 to which it is coupled is still short-circuited by the switch 11 which is still on. The diode 5 stops conducting and the current I6 is interrupted. The capacitor 2 is thus charged by the current I15 only.

Conservation of amp-turns by the windings 6 and 13 increases the current I13 which continues to flow through the diode 12, the diode 7 and the switch 11.

At instant t5, the switch 11 opens and the current I11 (equals I15+I13) which was passing through the switch 11 is interrupted. This current is diverted via the capacitor 9 which begins to charge.

The voltage across the terminals of the winding 13 can increase since the winding 6 to which it is coupled is not short-circuited by the switch 4 which has been open since instant t4. The diode 12 thus continues to conduct and the current I13 continues to flow via the winding 13, the diode 12, the diode 7, the diode 8 and the capacitor 9. The capacitor 9 is thus charged by a current I15+I13.

It can thus be seen that the magnetic energy stored in the winding 13 (which energy is equal to the sum of the energy stored in the windings 6 and 13 at instant t3, supposing losses to be negligible) serves to charge the capacitor 9 at a faster rate that the capacitor 2 from instant t5 onwards.

At instant t6, the voltage V9 across the capacitor 9 becomes equal to the voltage V2 across the capacitor 2 and the equalization error which existed at instant t5 is compensated, which is part of the purpose of the present invention.

At instant t6, the diode 5 starts conducting again and the current I6 begins to flow again via the diode 5, the capacitor 2, the diode 7 and the diode 8.

Since the voltages V2 and V9 are equal and since the windings 6 and 13 have the same number of turns, the currents I6 and I13 are also equal. The capacitors 2 and 9 thus both charge at the same rate, ie. the charging current I15 +I6 to the capacitor 2 is equal to the charging current I15 +I13 to the capacitor 9 since I6=I13.

At instant t7, $V2+V9=2\times V2=2\times V9=V$. The diode 14 thus starts conducting again and diverts the current I15 which ceases to charge the capacitors 2 and 9.

At instant t7, the current I16=I13 ceases to charge the capacitors 2 and 9 since V2=V9 cannot be greater than V because the diode 14 is conductive.

It can thus be seen that in spite of the time interval which exists between t5 and t4 (the different instants at which the switches 4 and 11 open), the voltages V4 and V11 across the switches 4 and 11 (which voltages are equal to V2 and V9 across the terminals of the corresponding capacitors 2 and 9) are equalized, and never exceed half the supply voltage V.

At instant t7, a large part of gthe initial magnetic energy is still stored in the windings 6 and 13 and can be seen in the form of a current I6=I13 flowing through he flywheel diode 14, the winding 13, the diode 12, the diode 7, the diode 8, the winding 6, the diode 5 and the voltage source.

The remaining magnetic energy stored in the windings is thus returned to the power supply, and the current I6=I13 decreases linearly as a function of time to become zero at instant t8.

It can thus be seen that the energy stored on the capacitors 2 and 9 at instant t1 is stored in the windings 6 and 13 between instants t2 and t5, and is then used in part between instants t5 and t7 to recharge the capacitors 2 and 9 while ensuring that the voltages V2 and V9 remain equal, thereby ensuring that the voltages V4 and V11 remain equal, with the remaining energy being returned to the power supply between instants t7 and t8.

At instant t8 the circuit is back in the same condition as at instant t1, and another cycle identical to the cycle described can now be performed, eg. starting at instant t9.

Figure 6:
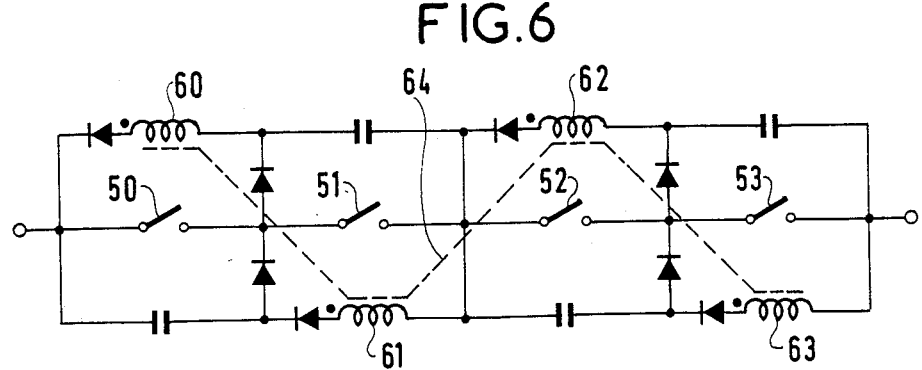
FIG. 6 is a diagram of a circuit in accordance with the invention applied to connecting four devices in series.

FIG. 6 shows a circuit in accordance with the invention applied to a series connection of four switches 50, 51, 52, and 53. The windings 60, 61, 62, and 63 all have the same number of turns and are all intercoupled on a common magnetic circuit, eg. a transformer 64. Static equalizer resistances (not shown) are connected in parallel with respective capacitors or with respective switches.

Figure 7:
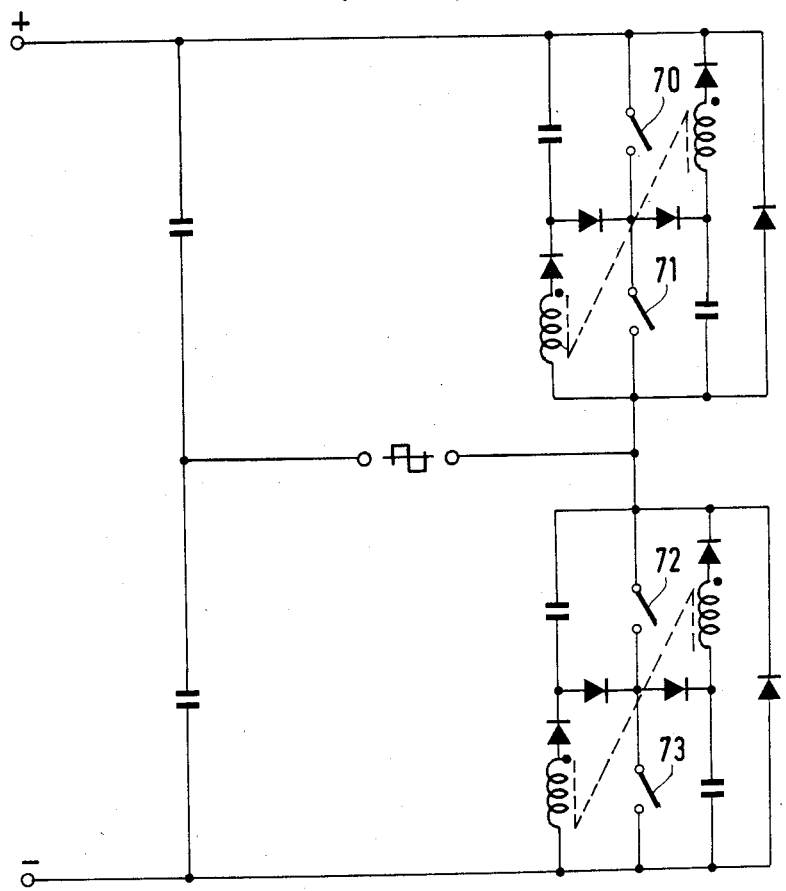
FIG. 7 is a diagram of a circuit in accordance with the invention applied to an inverter circuit.

FIG. 7 is a diagram of a circuit in accordance with the invention applied to a single phase inverter, with each half phase having two switches 70, 71 or 72, 73 connected in series. Static equalizing resistances (not shown) are connected in parallel with respective capacitors or with respective switches.

The invention extends to the use of any number of switches (but preferably an even number) connected in series, and to applications requiring such series connections of switches.

I claim:

1. An equalizer circuit for a plurality of switches connected in series between a voltage source and a load, each of said switches being connected in parallel with a respective equalizing capacitor via a respective diode, the improvement comprising a transformer having a plurality of windings, each of said windings being connected in series with a respective diode, and each of said switches having a respective winding-diode series connection connected in parallel therewith, whereby electrical energy initially stored in the capacitors is transferred for storage in magnetic form to the windings when the switches are closed and is re-used when the switches are opened to accelerate charging of the less charged capacitors until all the capacitors reach the voltage of the most charged capacitor.

2. An equalizer circuit according to claim 1, further including resistances connected in parallel with said capacitors for ensuring static equalization of the voltages across the capacitors.

3. An equalizer circuit according to claim 1, wherein said plurality of switches comprise two switches connected in series.

4. An equalizer circuit according to claim 1, wherein said plurality of switches comprise at least three switches connected in series, with each of said switches having a respective winding connected in parallel therewith and with all the windings constituting parts of a single transformer.

5. A single phase inverter comprising an equalizer circuit, said equalizer circuit comprising a plurality of switches connected in series between a voltage source and a load, said single phase inverter being constituted by two half phases formed by a series connection of two switches, each of said switches being connected in parallel with a respective equalizing capacitor via a respective diode, the improvement comprising a transformer having a plurality of windings, each of said windings being connected in series with a respective diode, and each of said switches having a respective winding-diode series connection connected in parallel therewith, whereby electrical energy initially stored in the capacitors is transferred for storage in magnetic form to the windings when the switches are closed and is re-used when the switches are open to accelerate charging of the less charged capacitors until all the capacitors reach the voltage of the most charged capacitor.

* * * * *